(12) United States Patent
Taguchi

(10) Patent No.: US 8,620,569 B2
(45) Date of Patent: Dec. 31, 2013

(54) VEHICLE CONTROL DEVICE

(75) Inventor: Koji Taguchi, Isehara (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/513,006

(22) PCT Filed: Dec. 17, 2009

(86) PCT No.: PCT/JP2009/071035
§ 371 (c)(1),
(2), (4) Date: May 31, 2012

(87) PCT Pub. No.: WO2011/074096
PCT Pub. Date: Jun. 23, 2011

(65) Prior Publication Data
US 2012/0239282 A1    Sep. 20, 2012

(51) Int. Cl.
*G06F 19/00* (2011.01)
(52) U.S. Cl.
USPC .......................................................... 701/119
(58) Field of Classification Search
USPC .......................................................... 701/119
See application file for complete search history.

(56) References Cited

U.S. PATENT DOCUMENTS

| | | | |
|---|---|---|---|
| 7,991,542 B2* | 8/2011 | Giles et al. | 701/119 |
| 2006/0155427 A1* | 7/2006 | Yang | 701/1 |
| 2007/0250263 A1 | 10/2007 | Yamada | |
| 2007/0299606 A1 | 12/2007 | Fujimoto | |
| 2008/0071460 A1* | 3/2008 | Lu | 701/93 |

FOREIGN PATENT DOCUMENTS

| | | |
|---|---|---|
| JP | 2005 184867 | 7/2005 |
| JP | 2006 327545 | 12/2006 |
| JP | 2007 225498 | 9/2007 |
| JP | 2007 290505 | 11/2007 |
| JP | 2008 129804 | 6/2008 |
| JP | 2009 70101 | 4/2009 |
| JP | 2009-529187 A | 8/2009 |
| JP | 2009 229199 | 10/2009 |

OTHER PUBLICATIONS

International Preliminary Report on Patentability issued Aug. 9, 2012 in PCT/JP2009/071035 filed Dec. 17, 2009.
International Preliminary Report on Patentability Issued Feb. 29, 2012 in PCT/JP09/71035 Filed Dec. 17, 2009.
International Search Report Issued Feb. 9, 2010 in PCT/JP09/71035 Filed Dec. 17, 2009.

* cited by examiner

*Primary Examiner* — James Trammell
*Assistant Examiner* — Michael D Lang
(74) *Attorney, Agent, or Firm* — Oblon, Spivak, McClelland, Maier & Neustadt, L.L.P.

(57) ABSTRACT

Disclosed is a vehicle control device that generates a speed pattern of a vehicle in a predetermined traveling section and controls the vehicle on the basis of the speed pattern. The vehicle control device includes an average traffic flow vehicle speed acquiring unit for acquiring an average traffic flow vehicle speed in the predetermined traveling section, an optimal low fuel consumption speed pattern generating unit for generating a speed pattern which is optimized to reduce the fuel consumption of the vehicle in the predetermined traveling section on the basis of the average traffic flow vehicle speed, and a control unit for controlling the vehicle on the basis of the optimal low fuel consumption speed pattern.

12 Claims, 4 Drawing Sheets

VEHICLE CONTROL DEVICE

TECHNICAL FIELD

The present invention relates to a vehicle control device.

BACKGROUND ART

As the technology of this field, for example, Japanese Unexamined Patent Application Publication No. 2008-129804 discloses a traveling control plan generating system. The traveling control plan generating system can hierarchically classify a traveling control plan into a high-level plan and a low-level plan and select the low-level plan of the vehicle on the basis of evaluation using a predetermined index, considering the low-level plan of surrounding vehicles, while satisfying the traveling plan of the vehicle, such as fuel efficiency, according to the high-level plan. Therefore, one vehicle is controlled on the basis of an appropriate plan according to predetermined conditions.

CITATION LIST

Patent Literature

[Patent Literature 1] Japanese Unexamined Patent Application Publication No. 2008-129804

SUMMARY OF INVENTION

Technical Problem

However, in the traveling control plan generating system disclosed in Patent Literature 1, for example, when traffic congestion occurs due to an increase in the number of vehicles, the vehicle cannot travel according to the generated traveling control plan and the traveling plan, such as fuel efficiency, cannot be satisfied.

An object of the invention is to provide a vehicle control device which generates an optimal low fuel consumption speed pattern considering the speed of surrounding vehicles, thereby driving the vehicle with high fuel efficiency.

Solution to Problem

In order to solve the above-mentioned problems, according to an aspect of the invention, there is provided a vehicle control device that generates a speed pattern of a vehicle in a predetermined traveling section and controls the vehicle on the basis of the speed pattern. The vehicle control device includes: average traffic flow vehicle speed acquiring means for acquiring an average traffic flow vehicle speed in the predetermined traveling section; optimal low fuel consumption speed pattern generating means for generating a speed pattern which is optimized to reduce the fuel consumption of the vehicle in the predetermined traveling section on the basis of the average traffic flow vehicle speed; and control means for controlling the vehicle on the basis of the optimal low fuel consumption speed pattern.

In the above-mentioned aspect of the invention, the average traffic flow vehicle speed acquiring means acquires the traffic flow vehicle speed in the predetermined traveling section. Therefore, it is possible to generate the speed pattern which is optimized to reduce the fuel consumption of the vehicle in the predetermined traveling section on the basis of the average traffic flow vehicle speed and drive the vehicle, considering the speed of the surrounding vehicles. Even when, for example, traffic congestion occurs, it is possible to drive the vehicle with high fuel efficiency.

In the vehicle control device according to the above-mentioned aspect, the predetermined traveling section may include a current section from a traveling position of the vehicle to a traffic blocking unit. The vehicle control device may further include blocking timing information acquiring means for acquiring blocking timing information of the traffic blocking unit and estimated traveling calculating means for calculating an estimated traveling speed and an estimated traveling distance in the current section of the vehicle on the basis of the average traffic flow vehicle speed and the blocking timing information. The optimal low fuel consumption speed pattern generating means may generate the optimal low fuel consumption speed pattern in the current section of the vehicle on the basis of the estimated traveling speed and the estimated traveling distance.

When there is a traffic blocking unit, such as a traffic signal, in a predetermined traveling section, traffic congestion is likely to occur due to, for example, the stop of the surrounding vehicles at the traffic blocking unit. However, in the invention, the blocking timing information of the traffic blocking unit is acquired and the estimated traveling speed and the estimated traveling distance in the current section from the traveling position of the vehicle to the traffic blocking unit are calculated on the basis of the average traffic flow vehicle speed and the blocking timing information. In this way, it is possible to generate the optimal low fuel consumption speed pattern in the current section of the vehicle and drive the vehicle with high fuel efficiency.

The vehicle control device according to the above-mentioned aspect may further include: stop determining means for determining whether the vehicle is stopped by the traffic blocking unit on the basis of the estimated traveling distance and a distance from the vehicle to the traffic blocking unit; transit speed calculating means for calculating a transit speed which enables the vehicle to pass through the traffic blocking unit when it is determined that the vehicle is not stopped by the traffic blocking unit; and transit speed pattern generating means for generating a transit speed pattern in the current section of the vehicle on the basis of the transit speed.

In the vehicle control device, when it is determined that the estimated traveling distance is longer than the distance from the vehicle to the traffic blocking unit, the vehicle is not stopped by the traffic blocking unit and energy loss due to stopping of the vehicle does not occur. Therefore, it is preferable to calculate the transit speed which enables the vehicle to pass through the traffic blocking unit and generate the transit speed pattern in the current section.

In the vehicle control device according to the above-mentioned aspect may further include: reliability calculating means for calculating reliability according to a route where the average traffic flow vehicle speed is acquired; and control adjusting means for adjusting the control of the vehicle based on the optimal low fuel consumption speed pattern, on the basis of reliability. The reliability of the average traffic flow vehicle speed varies depending on a route. Therefore, when reliability is calculated according to the route where the average traffic flow vehicle speed is acquired, it is possible to adjust the control of the vehicle based on the optimal low fuel consumption speed pattern on the basis of the reliability.

Advantageous Effects of Invention

According to the invention, it is possible to provide a vehicle control device that generates the optimal low fuel consumption speed pattern considering the speed of the surrounding vehicles, thereby driving the vehicle with high fuel efficiency.

DESCRIPTION OF EMBODIMENTS

Hereinafter, a vehicle control device according to an exemplary embodiment of the invention will be described in detail with reference to the accompanying drawings.

Figure 1:
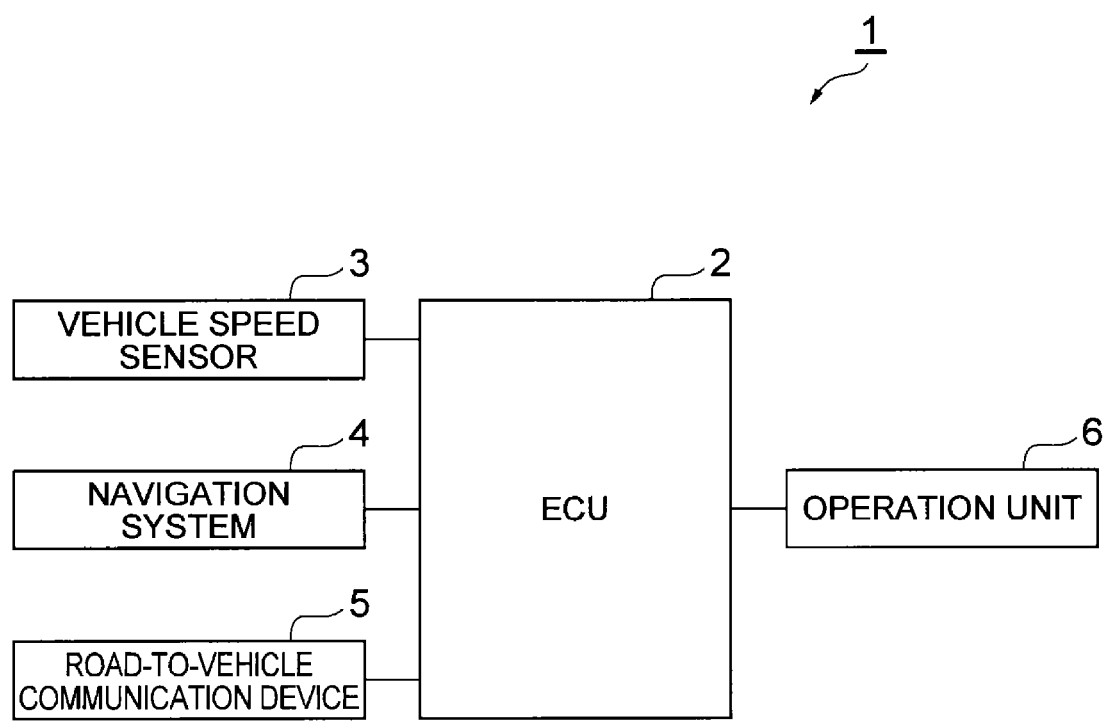
FIG. 1 is a block diagram illustrating the structure of a vehicle control device according to an embodiment of the invention.

As shown in FIG. 1, a vehicle control device 1 according to this embodiment generates a speed pattern which is optimized to reduce the fuel consumption of a vehicle A and controls the traveling of the vehicle A according to the optimal low fuel consumption speed pattern, thereby achieving optimal driving with low fuel consumption. The optimal low fuel consumption speed pattern is obtained by designing a target speed at each point on the expected traveling route of the vehicle A on the basis of an average traffic flow vehicle speed in a predetermined traveling section such that the optimal traveling of the vehicle A with low fuel consumption is achieved.

The vehicle control device 1 includes an ECU (Electric Control Unit) 2 which controls the overall operation of the device. The ECU 2 includes, for example, optimal low fuel consumption speed pattern generating means, estimated traveling calculating means, stop determining means, transit speed calculating means, transit speed pattern generating means, and control means and is electrically connected to vehicle speed sensors 3, a navigation system 4, a road-to-vehicle communication device 5, and an operation unit 6.

The vehicle speed sensors 3 are provided in four wheels of the vehicle A and detect the speed of the vehicle A from the rotational speeds of the wheels. The vehicle speed sensors 3 output the detected vehicle speed as vehicle speed information to the ECU 2.

The navigation system 4 performs route guidance from the present location to a destination which is set. The navigation system 4 includes a GPS receiver for detecting the current position of the vehicle A and a map database. The map database stores road shape information about the shape of the road or stop line information about the position of the stop line on the road. The navigation system 4 outputs information about the current position of the vehicle A and map data in the vicinity of the vehicle A as navigation information to the ECU 2. When detailed information about the average traffic flow vehicle speed from the sensor which is also used in, for example, VICS can be acquired, the sensor (or through a control center) acquires the average traffic flow vehicle speed.

The road-to-vehicle communication device 5 performs road-to-vehicle communication with an infrastructure, such as an optical beacon installed on the side of the road. For example, the infrastructure is installed considering road-to-vehicle communication at a position which is 200 meters ahead of a traffic signal B1, which is a traffic blocking unit. The road-to-vehicle communication device 5 performs road-to-vehicle communication with the infrastructure to acquire blocking timing information about the blocking timing (the timing when the color of the traffic signal is changed) of the traffic signal B1 in front of the vehicle A. The road-to-vehicle communication device 5 outputs the acquired blocking timing information to the ECU 2.

The operation unit 6 is for controlling the vehicle A. The operation control unit 6 includes, for example, a throttle actuator which controls a throttle valve of the engine, a brake actuator which controls a brake system, and a steering actuator which controls a steering mechanism. The operation unit 6 drives each actuator to control the vehicle A in response to instructions from the ECU 2.

The ECU 2 generates the optimal low fuel consumption speed pattern on the basis of various kinds of information acquired from the sensors 3 to 5 and controls the vehicle A according to the generated optimal low fuel consumption speed pattern. When generating the optimal low fuel consumption speed pattern, the ECU 2 determines whether the vehicle A is stopped at the traffic signal B1. If it is determined that the vehicle A can pass through the traffic signal B1 when the traffic signal B1 is green, the ECU 2 calculates a transit speed and generates a transit speed pattern in the current section since it gives priority to the passage of the vehicle through the traffic signal. Therefore, in this case, the ECU 2 does not generate the optimal low fuel consumption speed pattern. The ECU 2 outputs a command to the operation unit 6 on the basis of the generated optimal low fuel consumption speed pattern or transit speed pattern, thereby controlling the traveling of the vehicle A according to the optimal low fuel consumption speed pattern or the transit speed pattern.

Figure 2:
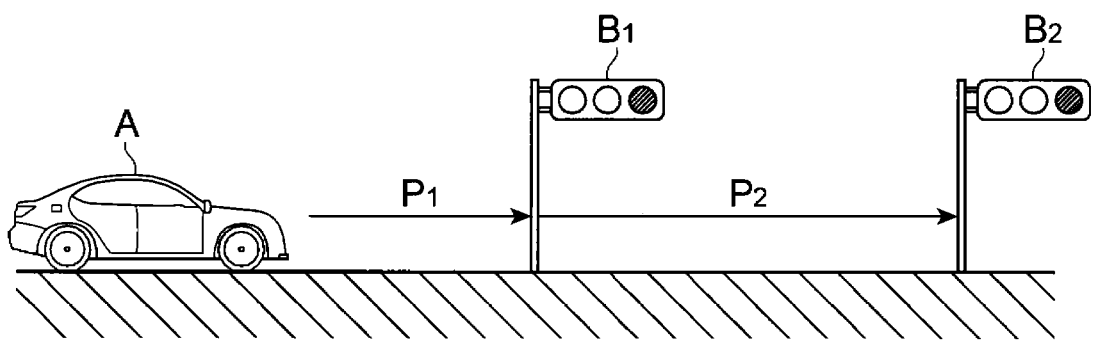
FIG. 2 is a conceptual diagram illustrating an example of the traveling of a vehicle including the vehicle control device shown in FIG. 1.

FIG. 2 is a conceptual diagram illustrating an example of the traveling of the vehicle A including the vehicle control device 1 shown in FIG. 1. The traveling section of the vehicle A includes a the current section P1 from the traveling position of the vehicle to the traffic signal B1 and the next section P2 from the traffic signal B1 to a traffic signal B2. Although not shown in FIG. 2, there are surrounding vehicles around the vehicle A. Therefore, for example, when the traffic signal B1 or the traffic signal B2 is red, traffic congestion is likely to occur in the current section or the next section.

Figure 3:
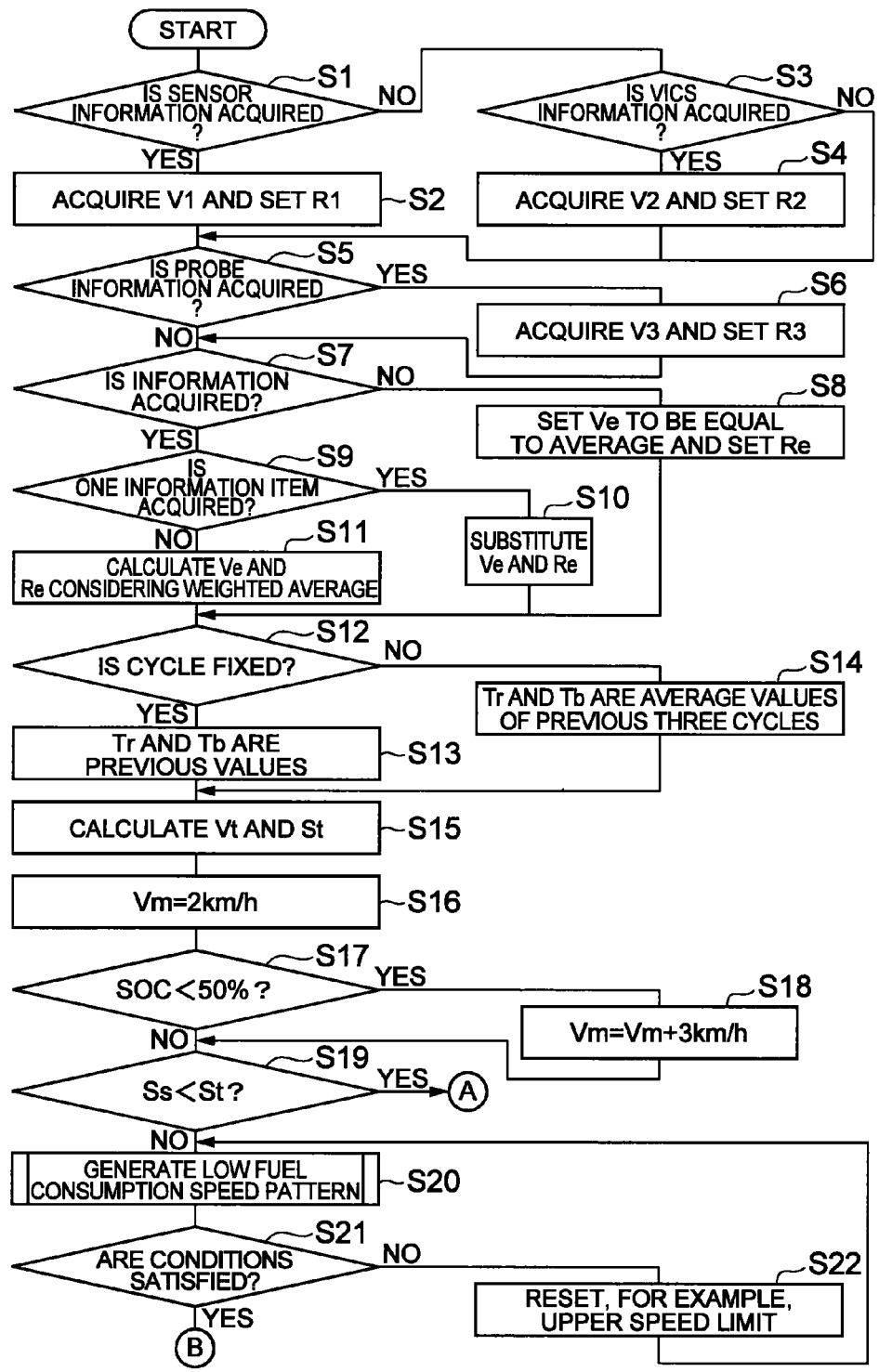
FIG. 3 is a flowchart illustrating the first half of a process of generating an optimal low fuel consumption speed pattern.
Figure 4:
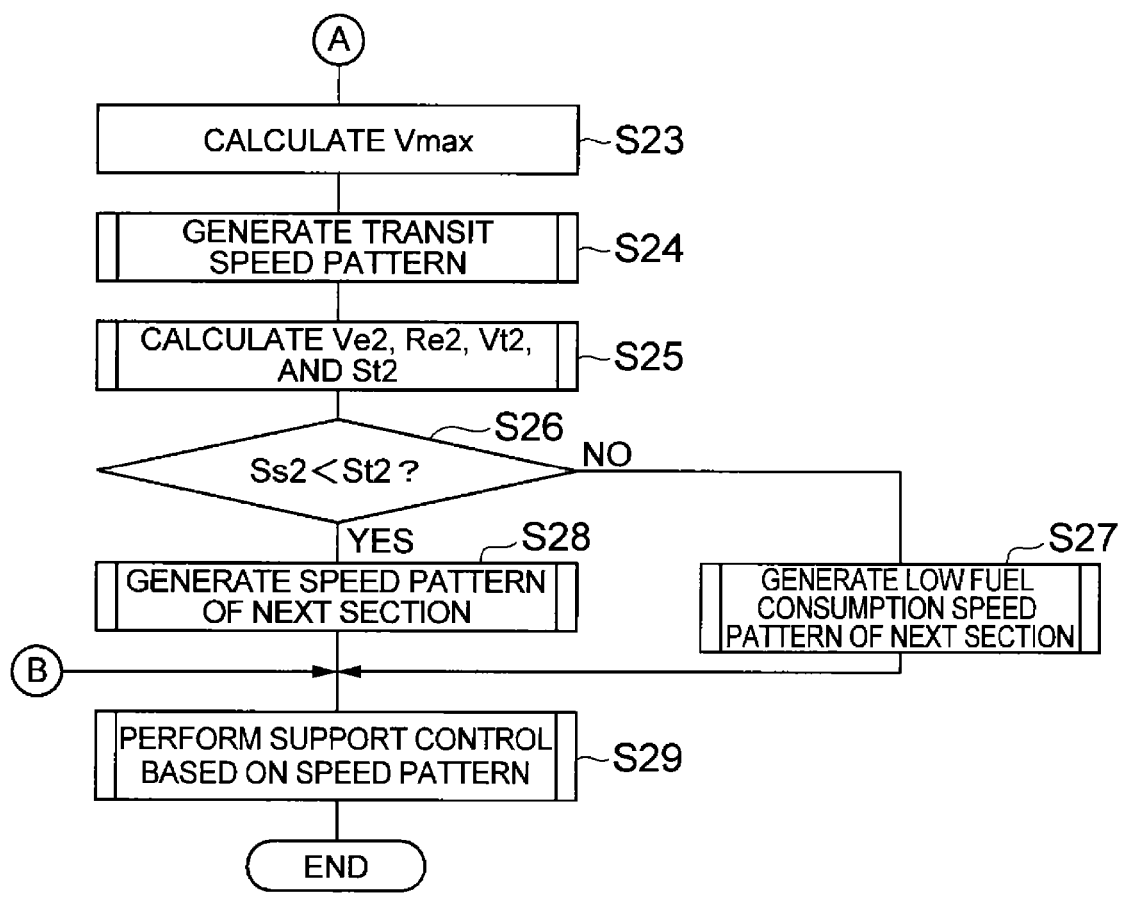
FIG. 4 is a flowchart illustrating the second half of the process of generating the optimal low fuel consumption speed pattern.

Next, an optimal low fuel consumption speed pattern generating process of the ECU 2 will be described with reference to the flowcharts shown in FIGS. 3 and 4. First, as shown in FIG. 3, in Step 1, it is determined whether the average of the speeds of a vehicle group traveling (hereinafter, referred to as an "average traffic flow vehicle speed") in the current section P1 can be acquired from the sensor (or through the control center) which is used in VICS installed on the road.

When the average traffic flow vehicle speed can be acquired from the sensor, the estimated reliability (R1) of the average traffic flow vehicle speed (V1) is set in Step 2. Since V1 is relatively detailed information acquired from the sensor, R1 is set to, for example, 50%. On the other hand, when the average traffic flow vehicle speed cannot be acquired from the sensor, it is determined whether the average traffic flow vehicle speed can be acquired from VICS information in Step 3.

When the average traffic flow vehicle speed can be acquired from VICS information, an average traffic flow vehicle speed (V2) is received through FM or a beacon and the estimated reliability (R2) of V2 is set in Step 4. When the average traffic flow vehicle speed acquired from the VICS information is the average traffic flow vehicle speed of a predetermined traveling section including the current section, R2 is set to, for example, 30% since the average traffic flow vehicle speed is not detailed data.

In Step 5, it is determined whether the navigation system 4 can access probe information. When the navigation system 4 can access probe information, an average traffic flow vehicle speed (V3) is acquired from the probe information and the estimated reliability (R3) of V3 is set in Step 6. Since the average traffic flow vehicle speed obtained from the probe information is real-time detailed data, R3 is set to, for example, 70%.

In Step 7, it is determined whether V1 to V3 can be acquired. When V1 to V3 cannot be acquired, the average speed (including the stop time) of the vehicle A for the past five minutes which is acquired by the vehicle speed sensor 3 is set as an estimated average traffic flow vehicle speed (Ve) in Step 8. In this case, average traffic flow vehicle speed reliability (Re) is set to a small value (for example, 10%) and Step 12 is skipped.

In Step 9, it is determined which one of the average traffic flow vehicle speeds V1 to V3 is acquired in Steps 1 to 7. When only one of the average traffic flow vehicle speeds V1 to V3 is acquired, the acquired average traffic flow vehicle speed is used as the estimated average traffic flow vehicle speed (for example: Ve=V1) and the average traffic flow vehicle speed reliability is substituted into the estimated reliability of the average traffic flow vehicle speed (for example: Re=R1) in Step 10.

When it is determined in Step 9 that two or more average traffic flow vehicle speeds are acquired, the above-mentioned calculation is performed considering a weighted average corresponding to the reliability of a plurality of acquisition channels in Step 11. For example, when V1 and V3 are obtained, for example, the estimated average traffic flow vehicle speed and the average traffic flow vehicle speed reliability are calculated by the following Expressions 1 and 2:

$$Ve=(V1\times R1+V3\times R3)/(R1+R3); \quad \text{[Expression 1]}$$

and $$Re=(R1+R3)/2. \quad \text{[Expression 2]}$$

Then, in Step 12, a signal cycle (the time of a red signal: Tr and the time of green and yellow signals: Tb), which is the blocking timing information of the traffic blocking unit (traffic signal B1) in the current section is acquired from an infrastructure enhancement system, such as a traffic signal or a control center, and it is determined whether the signal cycle is fixed. When the signal cycle is fixed, the previous signal cycle is used in Step 13. In general, there is a variation in each signal cycle in the range of about several seconds in order to optimize traffic flow. Therefore, when the signal cycle is not fixed, for example, the average cycle of the previous three signal cycles is used in Step 14.

In Step 15, when the assumed traveling time of the vehicle A is Tb and the assumed stop time of the vehicle A is Tr, the estimated traveling speed (Vt) and the estimated traveling distance (St) of the vehicle A in the current section are calculated by, for example, the following Expressions 3 and 4:

$$Vt=Ve/(Tb/(Tr+Tb)); \quad \text{[Expression 3]}$$

and $$St=Vt\cdot Tb. \quad \text{[Expression 4]}$$

Then, in Step 16, a control speed margin (Vm) is set and, for example, 2 km/h is substituted as the basic control error margin into Vm. In Step 17, it is determined whether the state of charge (SOC) of the battery is less than 50%. For example, when the state of charge of the battery is less than 50%, Vm is increased as represented by the following Expression 5 in Step 18:

$$Vm=Vm+3 \text{ km/h}. \quad \text{[Expression 5]}$$

The speed is generated considering the control margin. In this way, it is possible to prevent an increase in fuel consumption due to the unnecessary start of the engine and the unnecessary operation of a hydraulic brake caused by a predicted error and a control error.

In Step 19, it is determined whether St is more than the distance (Ss) to the traffic signal. When St is more than Ss, it is determined that the vehicle A can pass through the green light of the traffic signal B1 and the process skips to Step 23. On the other hand, when St is equal to or less than Ss, it is determined that the vehicle A cannot pass through the green light of the traffic signal B1 and a process of stopping the vehicle in the current section is performed. Specifically, in Step 20, for example, the upper speed limit is set to a value obtained by subtracting Vm from the legal speed limit (Vr) and the optimal low fuel consumption speed pattern is generated by, for example, an optimized technique, using St and Vt as conditions.

In Step 21, it is determined whether conditions, such as the average vehicle speed in Step 20, are satisfied. For example, it is determined whether the vehicle speed error is equal to or more than 5 km/h. When the conditions are satisfied, the process skips to Step 29. On the other hand, when the conditions, such as the average vehicle speed, are not satisfied, the conditions are reset in Step 22. For example, in Step 22, the upper speed limit increases. Then, in Step 20, the optimal low fuel consumption speed pattern is generated again.

Next, Step 23 and the subsequent steps will be described with reference to FIG. 4. In Step 23, for example, an optimal average speed (Vmax) which enables the vehicle to pass through the green light of the traffic signal B1 in the current section is calculated by the following expression when a green signal start time is Tb1 (sec):

$$V\max=\min(Vr, Ss/Tb1).$$

In Step 24, the transit speed pattern of the current section is generated using the relationship Vt=Vmax, similarly to Step 19 and Step 20. In the transit speed pattern, the highest priority is given to the passage of the vehicle through the green light of the traffic signal B1 in the current section. Therefore, in some cases, the speed pattern considering optimal low fuel consumption is not necessarily obtained.

In Step 25, similarly to Steps 1 to 15, Ve2, Re2, Vt2, and St2 are calculated using the transit speed and transit time of the traffic signal B1 in the current section which are obtained in Step 24 as initial conditions. In Step 26, when St2 is more than the distance (Ss2) to the traffic signal B2 in the next section, it is determined that the vehicle A can pass through the green light of the traffic signal B2 and the process skips to Step 28.

In Step 27, when it is determined that the vehicle A cannot pass through the green light of the traffic signal B2, the optimal low fuel consumption speed pattern of the next section is generated, similarly to Step 19 and Step 20. In Step 28, similarly to Step 22, the speed pattern of the next section is generated using the highest average speed which enables the vehicle to pass through the green light in the next section as a condition.

In Step 29, driver assistance technology is used to perform support control on the optimal low fuel consumption speed pattern. In this case, the reliability Re is added to a value indicating the degree of support (the larger the value, the stronger the degree of support), such as a forced guidance gain. In this way, the control adjusting means can adjust the support level.

As such, the vehicle control device 1 according to this embodiment acquires the average traffic flow vehicle speed in a predetermined traveling section and generates the speed pattern which is optimized to reduce the fuel consumption of the vehicle in the predetermined traveling section on the basis of the average traffic flow vehicle speed. In this way, it is possible to control the vehicle with the optimal low fuel consumption speed pattern considering the speed of the surrounding vehicles and thus drive the vehicle with high fuel efficiency.

The invention is not limited to the above-described embodiment. For example, the traffic blocking unit may be a railway crossing or a highway tollgate.

INDUSTRIAL APPLICABILITY

According to the invention, it is possible to provide a vehicle control device which generates the optimal low fuel consumption speed pattern, considering the speed of the surrounding vehicles, thereby driving the vehicle with high fuel efficiency.

REFERENCE SIGNS LIST

1: VEHICLE CONTROL DEVICE
2: ECU
3: VEHICLE SPEED SENSOR
4: NAVIGATION SYSTEM
5: ROAD-TO-VEHICLE COMMUNICATION DEVICE
6: OPERATION UNIT
A: VEHICLE
B1: FIRST TRAFFIC SIGNAL (FIRST TRAFFIC BLOCKING UNIT)
B2: SECOND TRAFFIC SIGNAL (SECOND TRAFFIC BLOCKING UNIT)
P1: CURRENT SECTION
P2: NEXT SECTION

The invention claimed is:

1. A vehicle control device that generates a speed pattern of a vehicle in a predetermined traveling section and controls the vehicle on the basis of the speed pattern, comprising:
average traffic flow vehicle speed acquiring unit for acquiring an average traffic flow vehicle speed in the predetermined traveling section;
optimal low fuel consumption speed pattern generating unit for generating a speed pattern which is optimized to reduce the fuel consumption of the vehicle in the predetermined traveling section on the basis of the average traffic flow vehicle speed;
control unit for controlling the vehicle on the basis of the optimal low fuel consumption speed pattern;
reliability calculating unit for calculating reliability according to a route where the average traffic flow vehicle speed is acquired; and
control adjusting unit for adjusting the control of the vehicle based on the optimal low fuel consumption speed pattern, on the basis of the reliability.

2. The vehicle control device according to claim 1, further comprising:
blocking timing information acquiring unit; and
estimated traveling calculating unit,
wherein the predetermined traveling section includes a current section from a traveling position of the vehicle to a traffic blocking unit,
the blocking timing information acquiring unit acquires blocking timing information of the traffic blocking unit,
the estimated traveling calculating unit calculates an estimated traveling speed and an estimated traveling distance in the current section of the vehicle on the basis of the average traffic flow vehicle speed and the blocking timing information, and
the optimal low fuel consumption speed pattern generating unit generates the optimal low fuel consumption speed pattern in the current section of the vehicle on the basis of the estimated traveling speed and the estimated traveling distance.

3. The vehicle control device according to claim 2, further comprising:
stop determining unit for determining whether the vehicle is stopped by the traffic blocking unit on the basis of the estimated traveling distance and a distance from the vehicle to the traffic blocking unit;
transit speed calculating unit for calculating a transit speed which enables the vehicle to pass through the traffic blocking unit when it is determined that the vehicle is not stopped by the traffic blocking unit; and
transit speed pattern generating unit for generating a transit speed pattern in the current section of the vehicle on the basis of the transit speed.

4. The vehicle control device according to claim 1, wherein two or more average traffic flow vehicle speeds are acquired by the average traffic flow vehicle speed acquiring unit, and calculation of the average traffic flow vehicle speed is performed considering a weighted average corresponding to a plurality of the average traffic flow vehicle speed reliabilities.

5. The vehicle control device according to claim 1, further comprising:
a control speed margin unit which sets a control error margin,
wherein an upper speed limit of the vehicle is set by subtracting the control error margin from a legal speed limit.

6. The vehicle control device according to claim 5, wherein the control speed margin unit updates the control error margin based on a state of charge of a battery.

7. A vehicle control device that generates a speed pattern of a vehicle in a predetermined traveling section and controls the vehicle on the basis of the speed pattern, comprising:
average traffic flow vehicle speed acquiring means for acquiring an average traffic flow vehicle speed in the predetermined traveling section;
optimal low fuel consumption speed pattern generating means for generating a speed pattern which is optimized to reduce the fuel consumption of the vehicle in the predetermined traveling section on the basis of the average traffic flow vehicle speed;
control means for controlling the vehicle on the basis of the optimal low fuel consumption speed pattern;
reliability calculating means for calculating reliability according to a route where the average traffic flow vehicle speed is acquired; and
control adjusting means for adjusting the control of the vehicle based on the optimal low fuel consumption speed pattern, on the basis of the reliability.

8. The vehicle control device according to claim 7, further comprising:
blocking timing information acquiring means; and
estimated traveling calculating means,
wherein the predetermined traveling section includes a current section from a traveling position of the vehicle to a traffic blocking unit, the blocking timing information acquiring means acquires blocking timing information of the traffic blocking unit, the estimated traveling calculating means calculates an estimated traveling speed and an estimated traveling distance in the current section of the vehicle on the basis of the average traffic flow vehicle speed and the blocking timing information, and the optimal low fuel consumption speed pattern generating means generates the optimal low fuel consumption speed pattern in the current section of the vehicle on the basis of the estimated traveling speed and the estimated traveling distance.

9. The vehicle control device according to claim 8, further comprising:

stop determining means for determining whether the vehicle is stopped by the traffic blocking unit on the basis of the estimated traveling distance and a distance from the vehicle to the traffic blocking unit;

transit speed calculating means for calculating a transit speed which enables the vehicle to pass through the traffic blocking unit when it is determined that the vehicle is not stopped by the traffic blocking unit; and transit speed pattern generating means for generating a transit speed pattern in the current section of the vehicle on the basis of the transit speed.

10. The vehicle control device according to claim 7, wherein two or more average traffic flow vehicle speeds are acquired by the average traffic flow vehicle speed acquiring means, and calculation of the average traffic flow vehicle speed is performed considering a weighted average corresponding to a plurality of the average traffic flow vehicle speed reliabilities.

11. The vehicle control device according to claim 7, further comprising:

control speed margin means for setting a control error margin, wherein an upper speed limit of the vehicle is set by subtracting the control error margin from a legal speed limit.

12. The vehicle control device according to claim 11, wherein the control speed margin means updates the control error margin based on a state of charge of a battery.

* * * * *